US006898634B2

(12) United States Patent
Collins et al.

(10) Patent No.: US 6,898,634 B2
(45) Date of Patent: May 24, 2005

(54) APPARATUS AND METHOD FOR CONFIGURING STORAGE CAPACITY ON A NETWORK FOR COMMON USE

(75) Inventors: Kevin Collins, Fort Collins, CO (US); Ronald E. Poppen-Chambers, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 800 days.

(21) Appl. No.: 09/799,658

(22) Filed: Mar. 6, 2001

(65) Prior Publication Data

US 2002/0129049 A1 Sep. 12, 2002

(51) Int. Cl.[7] ............................................. G06F 15/173
(52) U.S. Cl. ..................... 709/226; 709/215; 709/216; 709/229; 711/112; 711/152; 711/153; 711/173
(58) Field of Search ................................ 709/215, 216, 709/223–226, 229; 711/112, 170, 129, 150, 152, 153, 173; 710/36

(56) References Cited

U.S. PATENT DOCUMENTS

| 6,029,168 | A | | 2/2000 | Frey ............................ 707/10 |
| 6,640,278 | B1 | * | 10/2003 | Nolan et al. ................. 711/6 |
| 6,742,034 | B1 | * | 5/2004 | Schubert et al. ............ 709/226 |
| 2001/0020254 | A1 | * | 9/2001 | Blumenau et al. .......... 709/229 |
| 2002/0095602 | A1 | * | 7/2002 | Pherson et al. ............. 713/201 |

OTHER PUBLICATIONS

DataCore, "Storage Pooling in Storage Area Networks", 2000.*
Andy Watson, et al., "Multiprotocol Data Access: NFS, CIFS, and HTTP", May 1999, 28 pp.
DataCore Software, "Storage Pooling in Area Networks", 2001, 6 pp.
DataCore Software, "Storage Virtualization Defined", 2001, 1 p.

* cited by examiner

*Primary Examiner*—Frantz B. Jean

(57) ABSTRACT

An apparatus and method for identifying unused storage capacity of a number of network storage devices, and configuring at least a portion of the unused storage capacity as a logical storage device. The invention is preferably embodied in computer readable program code. The unused storage capacity may be identified by monitoring the number of network storage devices and automatically determining the unused storage capacity thereof. Alternatively, user-defined parameters may be used for identifying the unused storage capacity. At least a portion of the identified storage capacity is allocated for common use as at least one logical device. The allocated storage capacity is managed according to a management policy so that the allocated memory is not overwritten, data is not backed up to the same physical device, etc.

5 Claims, 6 Drawing Sheets

APPARATUS AND METHOD FOR CONFIGURING STORAGE CAPACITY ON A NETWORK FOR COMMON USE

FIELD OF THE INVENTION

The invention pertains to identifying the unused storage capacity of a number of storage devices on a network, and configuring at least a portion of the unused storage capacity for common use.

BACKGROUND OF THE INVENTION

Networks are commonly used to interconnect individual devices to one another on a network. For example, workstations, peripheral devices (e.g., printers, storage devices, etc.), and/or servers may be interconnected to one another over a network. Local area networks (LANs) are often used to interconnect these network devices within an office or even a household. Wide area networks (WANs) are often used to interconnect these network devices between remote locations (e.g., corporate departments via an intranet or even the Internet). Many networks include both LANs and WANs linked to one another for various purposes. Servers provided on these networks allow data and/or applications to be centrally stored and processed. For example, a server may be provided on the network for managing the e-commerce of a business, another server may be used to back-up data from individual workstations on the network, another server may be used for storing and providing central access to various software applications and databases, etc. However, the interconnectivity of a network by itself does not necessarily make optimum use of the available storage capacity thereof.

The use of storage capacity varies among network devices. Some network devices require significant storage capacity (e.g., for backup data, e-commerce management, etc.). Other network devices require, by comparison, very little storage capacity (e.g., an email workstation, storing individual user files, etc.). Likewise, storage capacity itself varies among network devices. Newer network devices may have more storage capacity than older network devices, and network devices dedicated to a WAN may have more storage capacity than network devices dedicated to a LAN. Therefore, some network devices may have sufficient storage capacity, while other network devices may have insufficient storage capacity.

As an illustration, consider a network linking three workstations to one another, or three servers to one another. Assume that each workstation or server has an attached storage device having a total capacity of one-hundred gigabytes. The first workstation or server may be used for e-commerce management, the second workstation or server may be used for backing-up the internal LAN, and the third workstation or server may be a multipurpose workstation or server. The first workstation or server may use nearly all of the attached storage capacity (e.g., 90%) for e-commerce management. While, the second workstation or server may not use as much attached storage capacity, it may still use a significant portion of its attached storage capacity (e.g., 80%). On the other hand, the third workstation or server may use hardly any of its attached storage capacity (e.g., 20%). Thus, the first workstation or server may soon, if not already, require additional storage capacity. Therefore, an additional storage device must be purchased and installed for use by the first workstation or server. However, there is significant storage capacity that is unused by the other two workstations or servers (i.e., one-hundred gigabytes, or the equivalent of an entire storage device). Therefore, the storage capacity is not efficiently distributed on the network.

One solution is to grant one or more network devices access to the storage device of one or more of the other network devices. However, the network device accessing the other storage devices must first determine whether storage capacity is available on the other storage devices. Where storage capacity is not available from a particular network device, the network device must continue to search the storage devices attached to the other network devices until it finds another storage device with sufficient storage capacity. Once another storage device has been identified, the network device accessing the other storage device must then maintain a log identifying particular files that are stored at each of the various other storage devices so that the files can later be retrieved. This can become particularly burdensome when files are stored at multiple other storage devices. Furthermore, a local user may not recognize a remotely-stored file and delete it, or otherwise inadvertently overwrite a remotely-stored file.

SUMMARY OF THE INVENTION

The inventors have devised apparatus and methods for identifying the unused storage capacity attached to a number of network devices, and configuring at least a portion of the unused storage capacity for common use. The invention thereby harnesses the storage that may be otherwise unused in a network environment, lowering the cost of storage by making efficient use of the storage already available.

An apparatus for configuring the unused storage capacity of a number of storage devices on the network is preferably embodied in computer readable program code. Program code identifies the unused storage capacity of the storage devices (e.g., hard disk drives attached to servers or workstations on the network). The program code for identifying the unused storage capacity may comprise program code for monitoring the storage devices and program code for automatically determining the unused storage capacity thereon. For example, each of the attached devices (e.g., the workstation or server having at least one storage device attached thereto) may be polled by an administrator terminal, or the like, as to the unused storage capacity of its storage device(s). Or for example, program code at the attached device may generate a signal (e.g., on a regular basis, at startup, when there is a change, etc.) indicating the unused storage capacity of its storage devices. Alternatively, parameters for identifying the unused storage capacity of the storage devices may be manually submitted (e.g., via a user interface). For example, an administrator or other user may specify the total unused storage capacity. Or for example, the administrator or other user may specify that a percentage of the unused storage capacity may be made available for common use over the network.

In any event, when the unused storage capacity is identified, program code allocates at least a portion of the unused storage capacity for common use (i.e., for access thereto over the network). Preferably the program code for allocating storage capacity comprises program code for aggregating the portion of the unused storage capacity as at least one logical device. For example, the logical device appears or is identified as a storage device accessible by other workstations or servers on the network.

Preferably, program code is also provided for managing the allocated storage capacity, for example, using a management policy. The management policy preferably includes a path to the logical device (e.g., a network address and directory) for access thereto. In addition, the management policy may include characteristics of the unused storage capacity, (e.g., the physical capacity of the storage device, a percentage of the unused storage capacity available for allocation, access speed, etc.). These characteristics may then be used to: create a logical device with similar characteristics (e.g., similar access protocols such as NFS, CIFS, etc.), manage the available capacity of the logical device, etc. The management policy may also include restrictions associated with the unused storage capacity. For example, a slower storage device may be designated for backup only, no video, no passcode protection, etc.

Furthermore, program code is also preferably provided for blocking direct access to the allocated storage capacity. That is, the attached device (e.g., workstation or server) from which the unused storage capacity is allocated may be unable to access the allocated storage capacity via a direct path to the storage device, and instead, may only be able to access the allocated storage capacity via a network path (e.g., a network path to the logical device). Preferably, the attached device is also unable to automatically access the storage capacity allocated therefrom via the network path, thus preventing data from being backed-up to the same physical device.

Also preferably, the unused storage capacity is dynamically allocated. That is, when necessary to fulfill the local storage needs of the attached device (i.e., the workstation or server from which at least a portion of the unused storage capacity was allocated), the unused storage capacity is reallocated back to the attached device when it is needed by the attached device. For example, where additional storage capacity is required by the attached device, a portion of the allocated storage capacity is reconfigured for direct access by the attached device. Files stored by others on the logical device using the storage capacity to be reallocated may be transferred to other logical drives, or another portion of an aggregate logical drive before it is reallocated.

A method for configuring the unused storage capacity of a number of storage devices on a network preferably comprises identifying the unused storage capacity of the storage devices and allocating at least a portion of the unused storage capacity for common use. Identifying the unused storage capacity may comprise monitoring the storage devices and automatically detecting the unused storage capacity thereof, may be based on user-defined parameters, or a combination thereof. Allocating the unused storage capacity preferably comprises aggregating the unused storage capacity as a logical device. The method also preferably includes managing access to the allocated storage capacity.

As such, unused storage capacity is efficiently distributed across the network. Furthermore, the unused storage capacity is allocated as at least one logical device, allowing transparent access thereto. That is, the logical device appears and is accessible via the network similarly to any other storage device on the network (e.g., via the "Network Neighborhood" icon on a MICROSOFT WINDOWS® operating system). In addition, access to the allocated storage capacity is managed to block direct access thereto by the attached device (i.e., from which it was originally allocated), so that the allocated storage capacity is not inadvertently overwritten. Likewise, outside access may be denied so as to protect sensitive data, while still allocating a portion of the storage device for common use.

These and other important advantages of the invention will be further explained in, or will become apparent from, the accompanying description, drawings and claims.

BRIEF DESCRIPTION OF THE DRAWINGS

An illustrative and presently preferred embodiment of the invention is illustrated in the drawings in which.

DESCRIPTION OF THE PREFERRED EMBODIMENT

Figure 1:
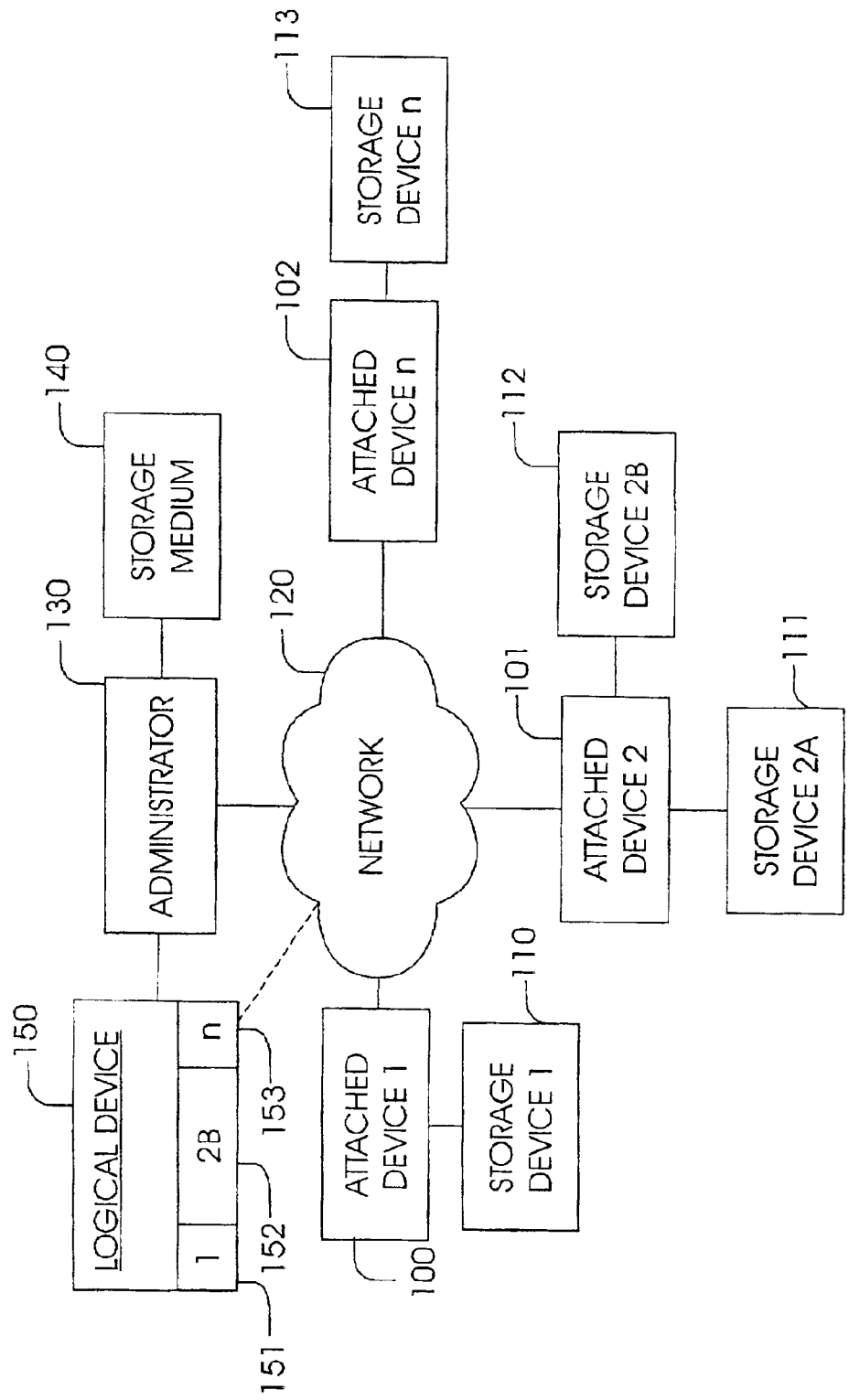
FIG. 1 is a block diagram showing storage devices on a network.

FIG. 1 shows a number of (i.e., one or more) network storage devices 110–113 and the attached devices 100–102 (e.g., workstations or servers) linked over a network 120 (e.g., a WAN, a LAN, an Intranet, the Internet). The storage devices 110–113 can be any fixed or removable disk drive which typically stores the files for the attached device 100. The storage devices 110–113 may be shared, password protected, etc. and others may even have read/write access thereto over the network 120, but access thereto is obtained only via the attached device 100. In addition, an administrator terminal 130 and its associated storage medium 140 may be linked over the network 120. Also shown in FIG. 1 is a logical device 150. The logical device 150 appears on the network 120 and is accessible therefrom (e.g., via the "Network Neighborhood" icon on a MICROSOFT WINDOWS® operating system).

It is understood that the term "administrator terminal" (and associated "storage device" and "storage medium") are used herein to indicate the functional aspects of each. In addition, the storage devices 110–113 (and storage medium 140) are preferably hard disk drives, but can be any suitable computer readable storage medium such as a hard disk drive, zip disk, compact disc (CD), magnetic tape, etc. In addition, the storage devices 110–113 may be any suitable network storage devices including, but not limited to Personal Computer or PC-attached storage devices, server-attached storage devices, etc. Preferably, the storage devices 110–113 are homogenous. That is, preferably, each of the storage devices 110–113 aggregated to form the logical device 150 are similar types (e.g., having similar access protocols, etc.).

Other network devices (not shown) may also be linked over the network 120, such as peripheral devices (e.g., printers, scanners), routers, hubs, etc. Indeed, any number of network devices may be linked over the network 120. Furthermore, the attached devices 100 and other network devices, if any, can be linked to the network 120 via any suitable means (e.g., modem, T-1, digital subscriber line (DSL), infrared, etc.), and may be linked through yet other devices (e.g., routers, hubs), other networks (e.g., LAN, Intranet), etc.

The invention is preferably embodied in firmware and/or software (i.e., computer readable program code), stored in computer readable storage media (e.g., storage medium 140 and/or storage device 110) and executed, for example, by the administrator terminal 130 and/or one or more of the attached devices 100–102. It is understood that the firmware and/or software may comprise more than one routine and/or subroutine, and may be embodied in separate components. In addition, the program code may be a stand-alone application, or may be a plug-in module for an existing application and/or operating system. Alternatively, the program code may be integrated into an application or operating system. In yet another embodiment, the program code can reside at one or more of the attached devices 100–102, another workstation or server, etc., or the program code can have components that reside at one or more locations on the network 120.

The following example illustrates one embodiment of storage distribution on the network 120. In this example, the storage devices 110–113 have a total capacity of twenty-five gigabytes each. In addition, Storage Device 1 (110) and Storage Device 2A (111) each have an unused storage capacity of ten gigabytes (i.e., 15 gigabytes is being used on each storage device 110, 111), Storage Device 2B (112) has an unused storage capacity of five gigabytes (i.e., twenty gigabytes is being used), and Storage Device n (113) has reached or is near capacity. Thus, Attached Device n (102) requires additional storage capacity (i.e., that an additional storage device be purchased and installed). However, the total unused storage capacity on the network 120 (i.e., storage devices 110, 111, and 112) is the equivalent of an entire unused storage device (i.e., twenty-five gigabytes). As such, the available storage capacity is not efficiently distributed on the network 120.

According to the teachings of the invention, storage capacity is efficiently distributed by identifying the unused storage capacity of the attached devices 100–102 (e.g., in a number of attached storage devices 110–113), and allocating at least a portion of the unused storage capacity for common use (e.g., as logical device 150 accessible via the network 120, shown via the dashed line in FIG. 1). For example, the unused storage capacity is shown in FIG. 1 allocated from Storage Device 1 (110), Storage Device 2B (112), and Storage Device n (113) as portions 151, 152, and 153 of the logical device, respectively. It is understood that the term "common use" as used herein may include aggregated storage capacity having restricted access to at least a portion thereof (e.g., via passcode protection), having dedicated access to at least a portion thereof (e.g., based on user identification), etc.

The following example illustrates one embodiment of storage distribution on the network 120 according to the teachings of the invention. Again, consider the storage devices 110–113 with the same characteristics as those given in the above example. The unused storage capacity is identified on the network 120 and allocated for common use. That is, the allocated storage capacity cannot be directly accessed without the consent of the person or program code managing the allocated storage capacity. Thus, the logical device 150 includes the aggregated or combined storage capacity, twenty-five gigabytes of which is available on the network 120 by accessing the logical device 150. Thus, although Storage Device n (113) has no unused storage capacity, Attached Device n (102), and other attached devices 100–101 and/or other network devices can access the logical device 150 to store data thereon, and therefore it does not necessarily require that another storage device be purchased and installed for use by Attached Device n (102).

In one embodiment, the unused storage capacity is automatically identified. For example, the administrator terminal 130 polls each of the attached devices 100–102 on the network 120, or each of the attached devices 100–102 generates a signal (e.g., on a regular basis, at startup, when there is a change, etc.). In any event, the unused storage capacity in the attached storage devices 110–113 is identified, and a portion (e.g., 10%, 80%, 100%) of the unused storage capacity is identified as available to allocate for common use. For example, where Storage Device 1 (110) has a total capacity of twenty-five gigabytes, fifteen gigabytes of which is unused storage capacity, only ten gigabytes may be identified as available to allocate for common use. As such, Attached Device 1 (100) requests that five gigabytes be reserved for direct access to account for fluctuations in local storage requirements (e.g., device operations).

Alternatively, the unused storage capacity is manually identified. That is, an administrator or user (e.g., at the administrator terminal 130, at a workstation, through an interface at the attached devices 100–102, etc.) defines parameters for identifying the unused storage capacity on one or more of the storage devices 110. For example, a suitable user interface is provided that allows the user to define parameters such as the number of attached storage devices 110, the total storage capacity, the total unused storage capacity, a portion of the total unused storage capacity to allocate and a portion to reserve for direct access, etc.

In yet another alternative embodiment, the unused storage capacity is identified automatically and manually. For example, program code automatically identifies the total unused storage capacity on the storage device 110, and the administrator or user identifies a portion of the total unused storage capacity that is available for allocation (e.g., 90%).

Figure 2:
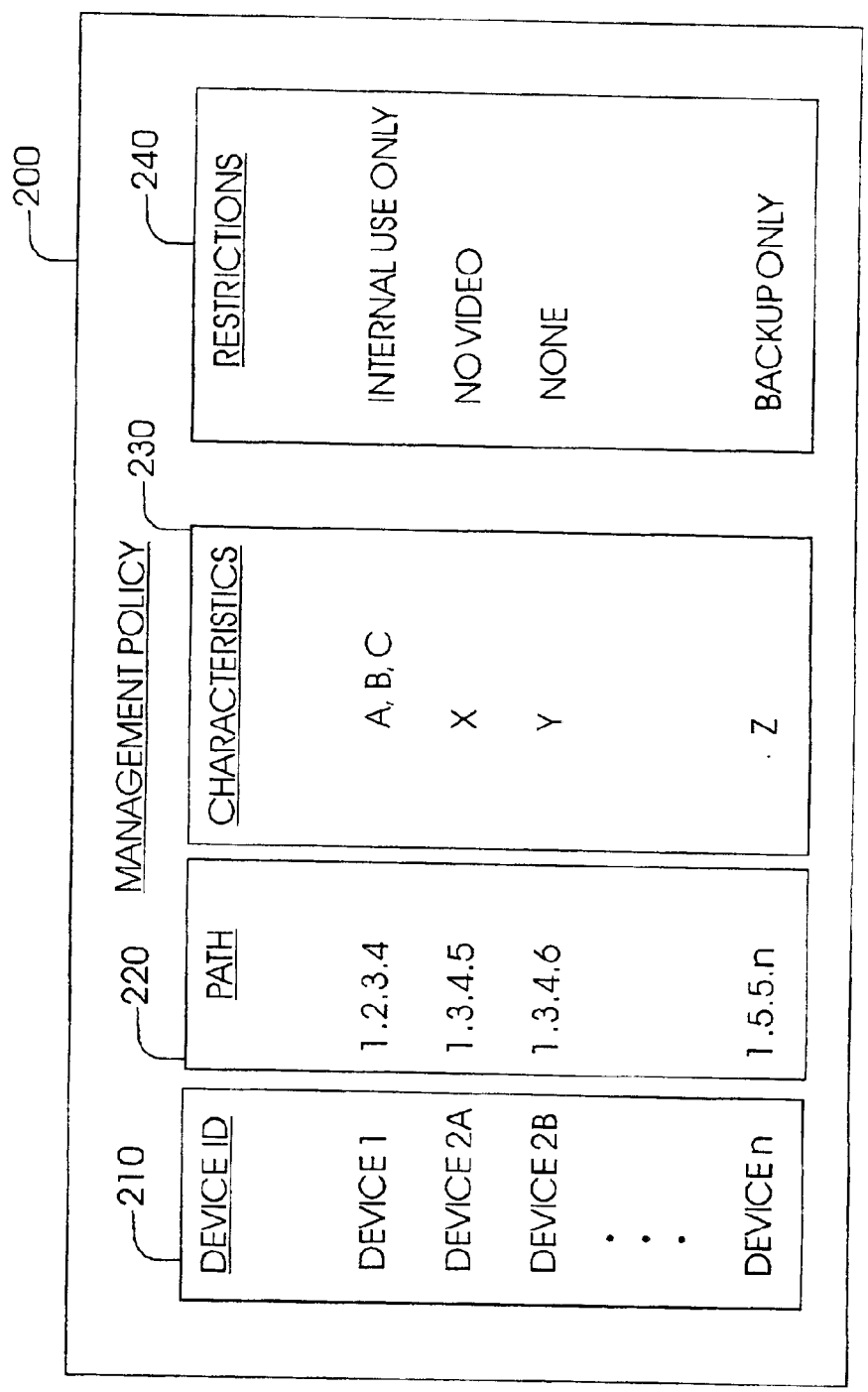
FIG. 2 is illustrative of a management policy.

Once the unused storage capacity is identified, the program code allocates the identified storage capacity for common use. That is, the administrator blocks the identified storage capacity from direct access (i.e., by the attached devices 100–102 from which it was allocated). The identified storage capacity may be, for example, partitioned or otherwise identified as a directory so that it can only be accessed as the logical device 150 via network 120. In other words, the attached devices 100–102 are prevented from directly accessing the portion of the storage device 110 that has been allocated, absent the consent of the person or program code managing the allocated storage capacity. In addition, the identified storage capacity is preferably aggregated or combined as at least one logical device 150 and access thereto is managed by the administrator terminal 130 using suitable program code and a management policy 200 (FIG. 2). The management policy 200 includes the individual network paths and the storage capacity at each of the network paths and is used to manage access to the logical device 150 when a user accesses the logical device 150 via the network path to the logical device 150.

The management policy 200 thus allows the individual network paths of the identified storage capacity to be managed (e.g., at the administrator terminal 130) so that access thereto is transparent to the user. That is, the logical device 150 appears on the network 120 as one or more unique storage devices. The logical device 150 is accessed (i.e., to read and/or write data thereto) similarly to accessing any storage device 110 on the network 120.

As an illustration, a user may create a directory on the logical device 150 to store word processing files. Although the user saves each file to the same directory on the logical device 150, one file may be saved to storage capacity allocated from Storage Device 2A (111), while another file may be saved to storage capacity allocated from Storage Device 2B, while yet another file may be saved to Storage Device n (113). However, regardless of the physical location of each file, the files are accessed via the same path (i.e., the single directory created on the logical device 150).

As another illustration, a user may write a five megabyte file to the logical device 150. After writing two of the five megabytes to the unused storage allocated from Storage Device 2A (111), Storage Device 2A (111) or the allocated portion thereof, may be full. Preferably, however, the user does not receive a "DISK FULL" message, as the logical device 150 still has additional storage capacity available for common use thereof. Instead, the five megabyte file is split (i.e., the remaining three megabytes is written to another portion of the logical device 150) or the entire five megabyte file is written to another portion of the logical device 150. Such routing of the user's file is preferably transparent to the user and the user only sees that the entire five megabyte file is written to the selected directory on the logical device 150. Indeed, in another embodiment, program code first checks the file size the user is writing to the logical device 150 and selects a portion of the logical device 150 (e.g., Storage Device 2B) having sufficient capacity allocated thereon for storing the entire file. For example, the program code may use information stored in the management policy 200, it may poll the allocated storage devices 110–113, etc. to select an appropriate portion of the storage device 150 for storing the file thereon.

In addition, the management policy 200 is used to direct write requests on the logical device 150 to alternate physical storage devices 110. For example, where data stored on Storage Device 1 (110) is backed-up to the logical device 150, the back-up data is physically written to allocated storage capacity comprising the logical device 150 that is not allocated from the same storage device (i.e., Storage Device 1 (110) in this example). Thus, were Storage Device 1 (110) to fail, the back-up data can still be retrieved from the logical device 150, as it has been written to a separate physical storage device. It is understood that management according to this embodiment may be limited to back-up requests where the access is identified as such (e.g., using a back-up application). Alternatively, such an embodiment may be a blanket policy for handling any data written to the logical device 150.

Furthermore, the allocated storage capacity may be dynamically managed. That is, as storage requirements of the attached devices 100–102 change, additional storage capacity is allocated to the logical device 150 and/or allocated storage capacity is reallocated back to the attached devices 100–102. For example, where additional storage capacity becomes available at Storage Device n (113), the same may be identified and allocated to the logical device 150. Also for example, where Attached Device 1 (100) requires additional storage capacity for direct access thereto, a portion of the allocated storage capacity from the logical device 150 may be reallocated back to Storage Device 1 (110). Such allocation and reallocation may occur simultaneously on more than one storage device 110 on the network 120. Likewise, such allocation and reallocation may occur when it is requested by the attached devices 100–102 or when it is determined during polling, etc.

As a further illustration, the allocated storage capacity may be manually managed via a system utility. For example, the system utility is operable by the user to consolidate files on attached storage device 110 and thus make storage capacity available for common use. The system utility may delete duplicate files, delete files that are no longer in use, defragment the storage device 110, etc. Or for example, the system utility may be operated by the administrator to similarly consolidate files on one or more storage devices 110 on the network 120, and thus make storage capacity available for common use. It is understood, however, that such a utility need not be a "system" utility and may take any suitable form, such as a standalone application, applet, etc.

The above examples are merely illustrative of management of the logical device 150, and other embodiments are contemplated as being within the scope of the teachings of the invention. The logical device 150 may also be managed with respect to characteristics and/or restrictions associated with the identified storage capacity. For example, the storage capacity allocated from Storage Device 1 (110) may be designated for internal use only. That is, the respective portion of the logical device 150 may only be accessed over a LAN or an intranet. Or for example, the storage capacity for a portion of the logical device 150 may be passcode protected. In another example, a slow device may be designated as excluding video storage. Or for example, where a large sector of storage capacity is allocated from a single storage device, the respective portion of the logical device 150 may be designated for back-up data. Likewise, these characteristics may be used to create logical devices with similar characteristics (e.g., a logical device comprised of "fast" storage devices and another comprised of "slow" storage devices).

FIG. 2 shows an embodiment of a management policy 200. The management policy 200 includes a device ID 210, a respective path 220, and characteristics 230 and restrictions 240 associated therewith. The device ID 210 identifies the storage device 110 with unused capacity. For example, the device ID 210 may be a generic identifier (e.g., Device 1), a fixed identifier (e.g., an IP address), a combination thereof, etc. The path 220 identifies the path to the identified storage capacity. For example, the path 220 may be a network address, a drive name, a directory or subdirectory, a combination thereof, etc. The characteristics 230 identify parameters of the storage device 110 identified by the device ID. For example, the characteristics 230 may include the unused capacity available for allocation on the storage device 110, the speed of the storage device 110, the percentage of unused capacity that may be allocated on the storage device 110, etc. The restrictions 240 identify any restrictions associated with the device ID. For example, the restrictions 240 may include the restriction "Internal Use Only", indicating that the storage capacity is limited to access only via the intranet and no outside access is permitted (e.g., for security purposes). Or for example, the restrictions 240 may include the restriction "No Video", indicating that the access thereto is slow; or "Backup Only", indicating a large storage capacity.

It is understood that the invention is not limited to the management policy 200 shown and described with respect to FIG. 2. For example, in one embodiment the device ID 210 need not be included at all. Or for example, multiple restrictions 240 may be included for each device ID 210. Or as yet another example, the restrictions 240 may be included as characteristics 230 or vice versa. Other embodiments are also contemplated as being within the scope of the teachings of the invention.

Figure 3:
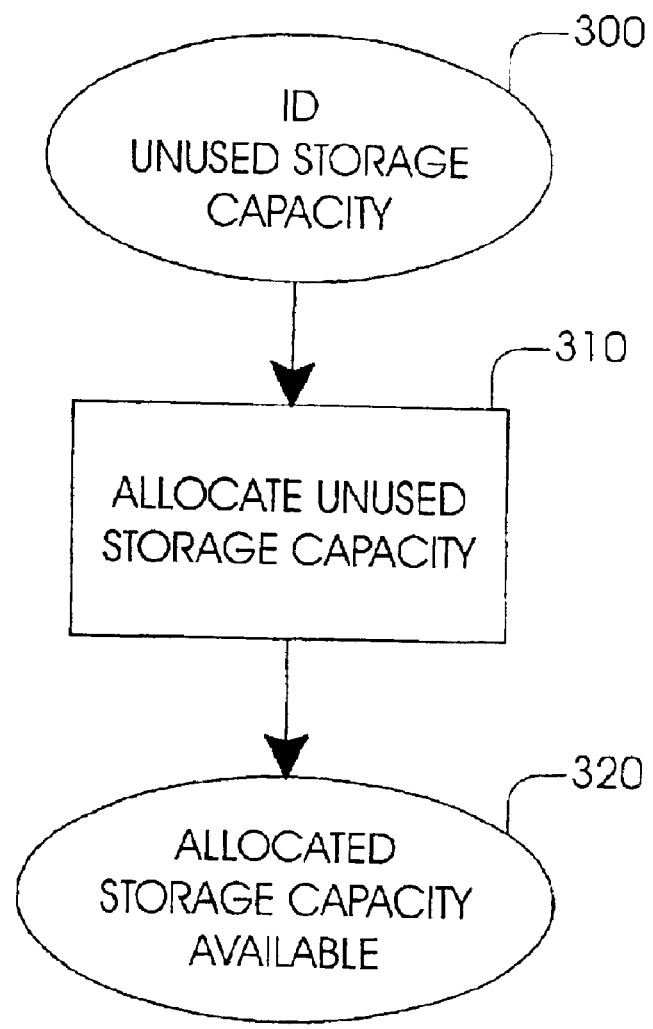
FIG. 3 is a flow chart showing the steps of one embodiment of the invention.
Figure 4:
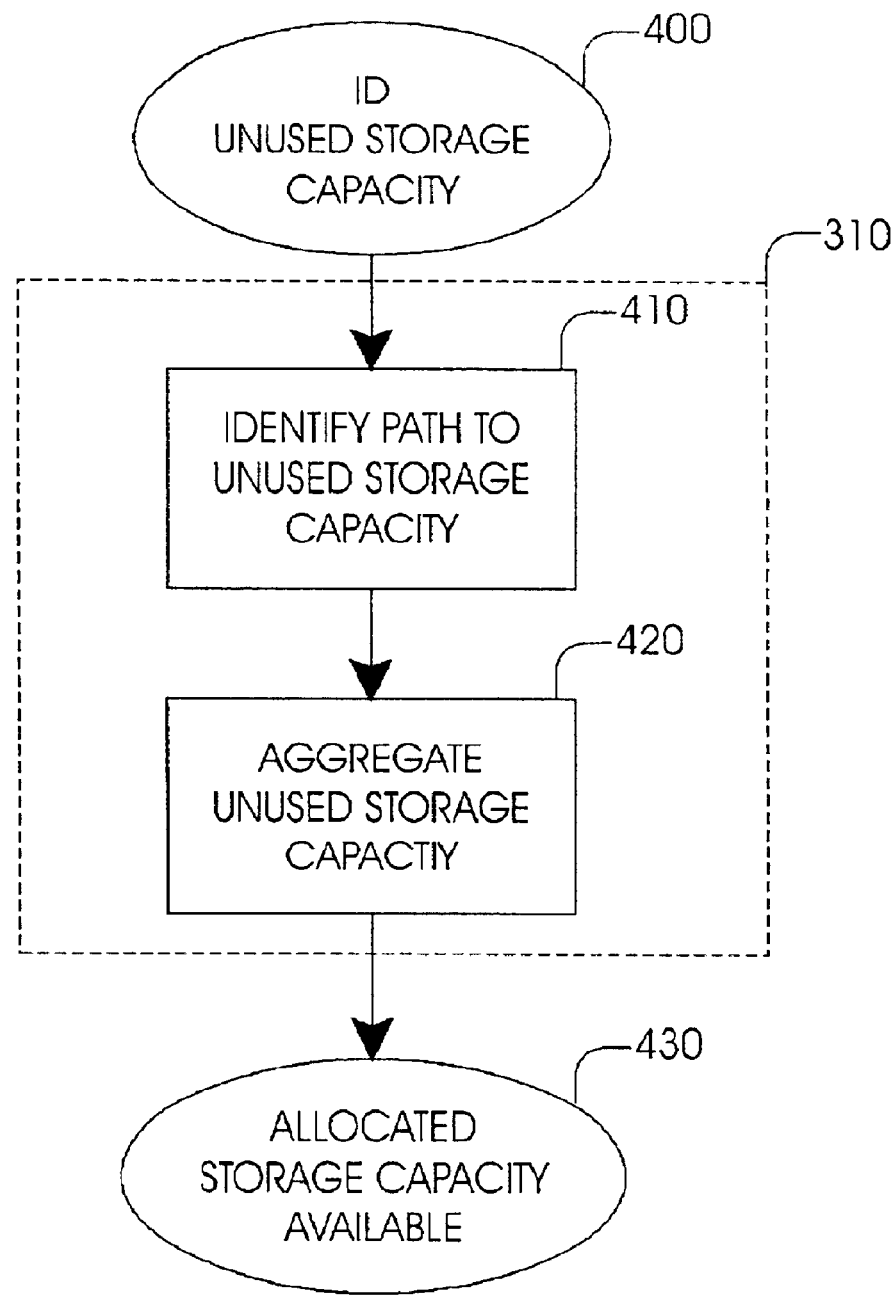
FIG. 4 is a flow chart showing the steps of another embodiment of the invention, illustrating a preferred embodiment for allocating unused storage capacity.

FIG. 3 illustrates an embodiment of the method of the invention. In step 300, the unused storage capacity of the attached devices 100–102 is identified. Identifying the unused storage capacity may be done automatically, manually, or a combination thereof. For example, the administrator terminal 130 polls each of the attached devices 100–102 on the network 120 to determine whether there is unused storage capacity in the storage devices 110–113, as explained above. Or for example, an administrator or other user identifies unused storage capacity using a suitable user interface and user-defined parameters, also as explained above. Or for example, the unused storage capacity is identified using a combination of user-defined parameters and automatically determined parameters. In step 310, the unused storage capacity is allocated for common access. That is, the identified storage capacity is partitioned or otherwise sectioned (e.g., as a directory), a path is logged (e.g., in management policy 200), and the identified storage capacity is made available via the network 120 (e.g., as logical device 150). Preferably, the allocated storage capacity is blocked from direct access (i.e., by the associated attached devices 100–102), so that data is not inadvertently overwritten, data is not backed-up to the same physical device, etc. In step 320, the allocated storage capacity is available for access thereto over the network 120, such as by accessing the logical device 150 similarly to accessing any other physical storage device 110 on the network 120. Another embodiment of the method of the invention is shown in FIG. 4, illustrating a preferred embodiment of allocating unused storage capacity (e.g., step 310 in FIG. 3). In step 400, the unused storage capacity of the attached devices 100–102 is identified. In step 410, a path to the identified storage capacity is identified. In step 420, the identified storage capacity is aggregated or combined, preferably as at least one virtual storage device 150 (e.g., according to a management policy 200). Thus, the logical device is accessible via the network 120 by identifying a path to the logical device 150, as opposed to individual paths to each storage device 110. In step 430, the storage capacity is available for access thereto over the network 120 (e.g., by accessing the logical device 150). Access to the allocated storage capacity is transparent on the network 120.

Figure 5:
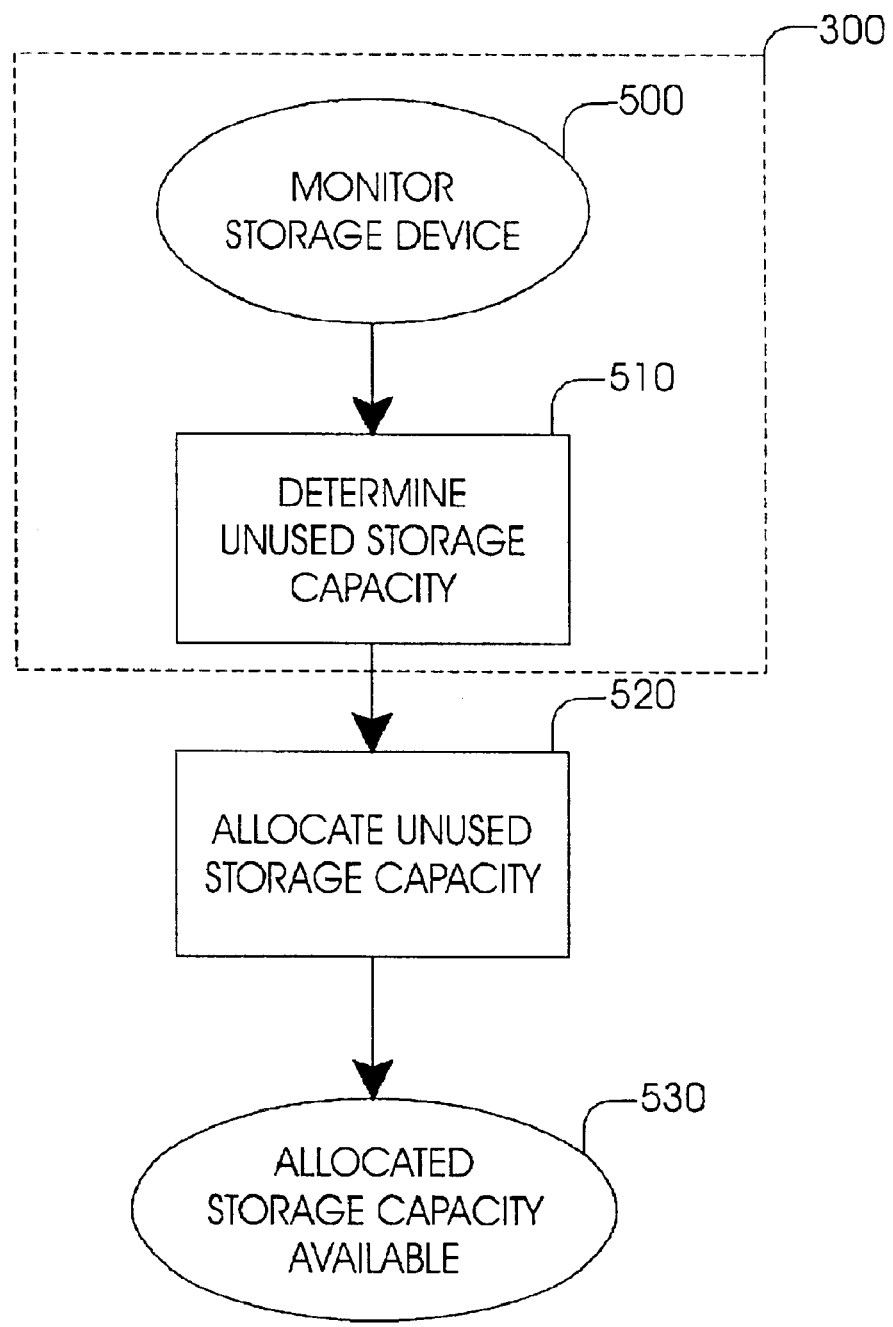
FIG. 5 is a flow chart showing the steps of yet another embodiment of the invention, illustrating a preferred embodiment for identifying unused storage capacity.

Yet another embodiment of the method of the invention is shown in FIG. 5, illustrating a preferred embodiment for identifying the unused storage capacity of the attached devices 100–102 (e.g., step 300 in FIG. 3). In step 500, the storage devices 110 on the network 120 are monitored. For example, the storage devices 110 are centrally monitored (e.g., via polling by the administrator terminal 130). Or for example, the storage devices 110 are self-monitored via self-executing program code or via a user (e.g., through a user interface). In step 510, at least a portion of the unused storage capacity is determined as available for allocation. For example, the user or an administrator specifies a portion of the unused storage capacity via a user interface. Or for example, the same is automatically determined, or determined based on a combination of automatic and manual operations. In step 520, the unused storage capacity is allocated. In step 530, the allocated storage capacity is available for access thereto over the network 120.

Figure 6:
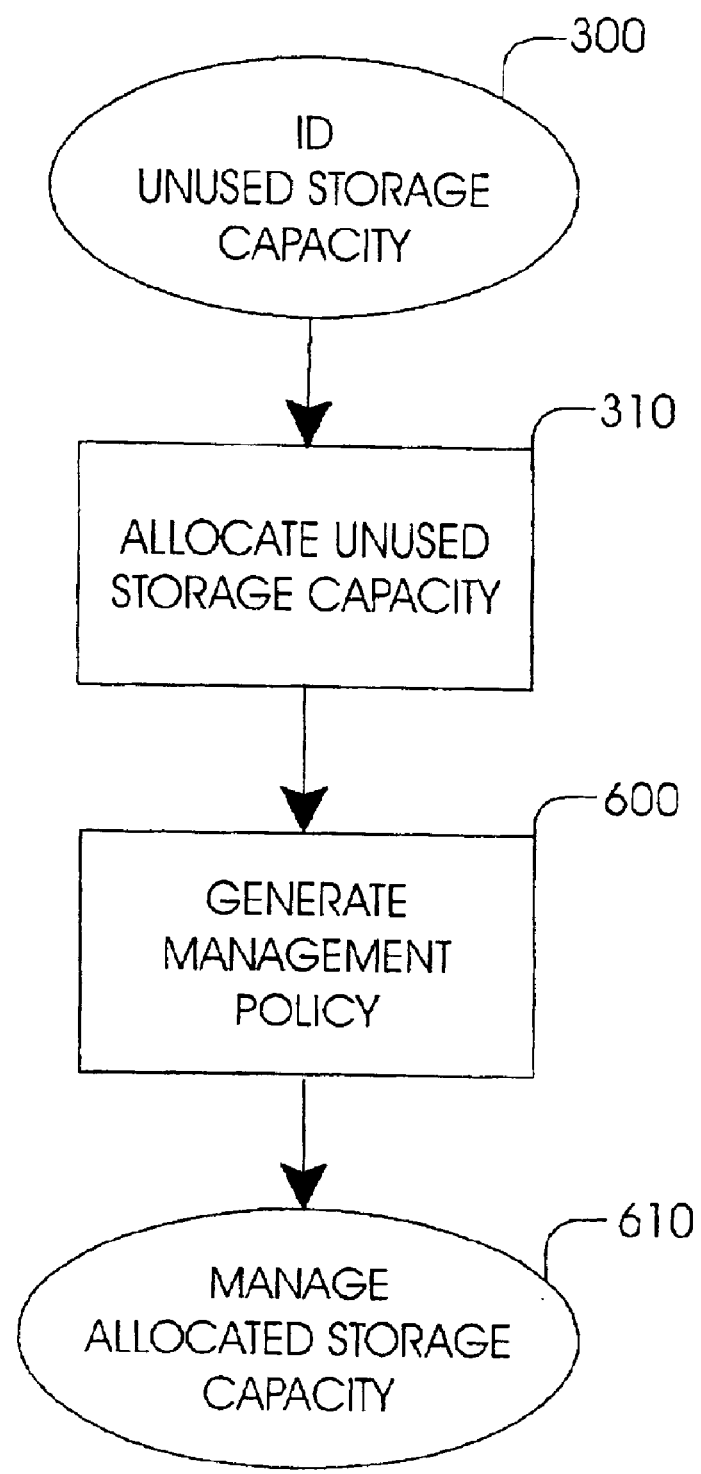
FIG. 6 is a flow chart showing the steps of yet another embodiment of the invention, illustrating a preferred embodiment for managing the allocated storage capacity.

Yet another embodiment of the method of the invention is shown in FIG. 6, illustrating a preferred embodiment of managing the allocated storage capacity. In step 300, the unused storage capacity is identified on the network 120. The unused storage capacity is allocated in step 310. In step 600, a management policy 200 is generated (e.g., at the administrator terminal 130). The management policy 200 is used to manage the allocated storage capacity (step 610). For example, the allocated storage capacity is managed by directing write requests on the logical device to alternate physical storage devices 110. Also for example, the allocated storage capacity is managed by making access to the allocated storage capacity transparent on the network 120 (e.g., through the use of a logical device 150). In yet another example, the allocated storage capacity is managed by dynamically allocating and reallocating storage capacity on the network 120. Other examples of managing the allocated storage capacity are also contemplated as being within the scope of the invention.

It is understood that the method of the invention is not limited to the various embodiments shown and described with respect to FIG. 3 through FIG. 6. For example, the steps shown in the various embodiments of these figures may be combined with one another. Or for example, the steps shown in the various embodiments of these figures may be substituted for one another. Likewise, the method may include additional steps not shown, but inherent under the teachings of the invention.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A computer, connectable to a network, comprising:

direct attached storage; and program code configured to:

monitor unused storage capacity of the storage;

identify a portion of the unused storage capacity as available storage capacity;

block the computer's direct access to the available storage capacity;

allocate the available storage capacity to a network administrator for purposes of aggregating the available storage capacity with other storage capacity on the network; and if the allocated storage capacity becomes needed to serve local storage needs of the computer, dynamically request re-allocation of at least a portion of the available storage capacity back to the computer and, upon said re-allocation, allow the computer's direct access thereto.

2. The computer of claim 1, wherein the program code is self-executing.

3. The computer of claim 1, further comprising an interface through which a user of the computer can identify said available storage capacity.

4. The computer of claim 1, wherein the program code initiates its identifying, blocking and allocating actions in response to a polling request received over the network.

5. The computer of claim 1, wherein the program code provides the network administrator with access speed of the available storage capacity.

* * * * *